(12) United States Patent
Zandsteeg et al.

(10) Patent No.: US 10,882,199 B2
(45) Date of Patent: Jan. 5, 2021

(54) POSITION MONITORING FOR A HAIR PROCESSING SYSTEM

(71) Applicant: KONINKLIJKE PHILIPS N.V., Eindhoven (NL)

(72) Inventors: Cornelis Johannes Zandsteeg, Eindhoven (NL); Geert-Jan Darwinkel, Eindhoven (NL); Lolke Klaas Salverda, Eindhoven (NL); Roderik De Vries, Eindhoven (NL); Jeroen Keijer, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 95 days.

(21) Appl. No.: 16/311,208

(22) PCT Filed: Jun. 21, 2017

(86) PCT No.: PCT/EP2017/065303
§ 371 (c)(1),
(2) Date: Dec. 19, 2018

(87) PCT Pub. No.: WO2017/220689
PCT Pub. Date: Dec. 28, 2017

(65) Prior Publication Data
US 2019/0232510 A1 Aug. 1, 2019

(30) Foreign Application Priority Data
Jun. 24, 2016 (EP) .................................. 16176159

(51) Int. Cl.
*A45D 44/00* (2006.01)
*B26B 19/38* (2006.01)
(Continued)

(52) U.S. Cl.
CPC .......... *B26B 19/388* (2013.01); *A45D 44/005* (2013.01); *G01B 7/003* (2013.01);
(Continued)

(58) Field of Classification Search
CPC ....... B26B 19/388; B26B 19/20; B26B 19/38; G01D 5/142; G01D 5/20; G01D 5/14;
(Continued)

(56) References Cited

U.S. PATENT DOCUMENTS 7,532,901 B1    5/2009  Lafranchise
10,773,400 B2 * 9/2020  Lauritsen .............. B26B 19/388
(Continued)

FOREIGN PATENT DOCUMENTS

WO    2006039698 A1    4/2006
WO    2010076676 A1    7/2010
(Continued)

*Primary Examiner* — Ghassem Alie
*Assistant Examiner* — Nhat Chieu Q Do

(57) ABSTRACT

A method of operating an automated hair processing system (10) and the automated hair processing system (10), comprising a portable hand-held hair processing appliance, a hair processing unit arranged at the appliance, and a position monitoring arrangement (30), the arrangement comprising a plurality of position sensors (32) arranged to be attached to a subject (12) whose hair is to be processed, a transmitter (34) that is operatively coupled with at least two position sensors (32) of the plurality of position sensors (32), and a position controller (42) that is arranged to detect a relative orientation between the at least two position sensors (32) of the plurality of position sensors (32) attached to the subject whose hair, and that signals a misorientation state.

10 Claims, 5 Drawing Sheets

(51) Int. Cl.
  *G01B 7/00* (2006.01)
  *G01D 5/14* (2006.01)
  *G01D 5/20* (2006.01)
  *B26B 19/20* (2006.01)

(52) U.S. Cl.
  CPC ............... *G01D 5/142* (2013.01); *G01D 5/20* (2013.01); *B26B 19/20* (2013.01)

(58) Field of Classification Search
  CPC ........ G01D 7/003; G01D 7/00; A45D 44/005; A45D 44/00; H04R 1/105; H04R 1/1058; H04R 1/1066; H04R 1/1075; H04R 25/554; H04R 1/1016; H04R 25/407
  USPC .................................................. 381/23.1, 313
  See application file for complete search history.

(56) References Cited

U.S. PATENT DOCUMENTS

| | | | |
|---|---|---|---|
| 2003/0184285 A1 | 10/2003 | Anderson | |
| 2010/0274121 A1 | 10/2010 | Ritchey | |
| 2010/0312038 A1 | 12/2010 | Shechter | |
| 2013/0040783 A1 | 2/2013 | Duda | |
| 2014/0102271 A1* | 4/2014 | Krenik | B26B 19/3846 83/13 |
| 2014/0137714 A1* | 5/2014 | Krenik | B26B 19/3806 83/23 |
| 2014/0182138 A1* | 7/2014 | Krenik | B26B 19/3846 30/123 |
| 2014/0200734 A1* | 7/2014 | Krenik | G05B 15/02 700/302 |
| 2015/0040934 A1* | 2/2015 | Krenik | B26B 19/388 132/200 |
| 2015/0059187 A1* | 3/2015 | Krenik | B26B 19/42 30/123 |
| 2015/0197016 A1* | 7/2015 | Krenik | B26B 19/388 83/13 |
| 2015/0217465 A1* | 8/2015 | Krenik | B26B 19/388 700/90 |
| 2015/0321365 A1 | 11/2015 | Lauritsen | |
| 2016/0263754 A1* | 9/2016 | Lauritsen | A45D 24/36 |
| 2017/0010603 A1* | 1/2017 | Ingleton | G01B 7/003 |
| 2018/0024507 A1* | 1/2018 | Godlieb | A61C 17/221 700/62 |

FOREIGN PATENT DOCUMENTS

| | | | |
|---|---|---|---|
| WO | 2013163999 A1 | 11/2013 | |
| WO | WO-2013163999 A1 * | 11/2013 | .......... B26B 19/388 |
| WO | WO-2015063651 A1 * | 5/2015 | .......... B26B 19/388 |
| WO | WO-2015068068 A1 * | 5/2015 | .......... B26B 19/388 |

* cited by examiner

POSITION MONITORING FOR A HAIR PROCESSING SYSTEM

This application is the U.S. National Phase application under 35 U.S.C. § 371 of International Application No. PCT/EP2017/065303, filed on Jun. 21, 2017, which claims the benefit of International Application No. 16176159.8 filed on Jun. 24, 2016. These applications are hereby incorporated by reference herein.

FIELD OF THE INVENTION

The present disclosure relates to a position monitoring arrangement for an automated hair processing system and to an automated hair processing system. The disclosure further relates to a method of operating an automated hair processing system and to a corresponding computer program.

As used herein, automated hair processing (or: hairstyling) particularly relates to an approach that involves processing, particularly cutting, a subject's hair with an appliance that is capable of automatically adjusting at least one operation parameter, particularly a cutting length, depending on or as a function of an actual location of the processing appliance with respect to the individual subject. Automated hairstyle processing may be also referred to as automatic, semi-automatic or smart hairstyle processing.

The term automated hairstyle processing does not necessarily exclude any human/manual contribution or intervention. For instance, hand-held and hand-guided hair cutting appliances may be used which implement an automated adjustment of an actual cutting length. Hence, automated hairstyling within the context of the present disclosure may also be referred to as computer-aided or computer-assisted smart hairstyling. Computing capacity may be provided be the hair processing appliance itself or by another device that is coupled thereto, such as a mobile phone, a tablet computer, etc.

BACKGROUND OF THE INVENTION

Haircutting and hairstyling are, to a great extent, manual tasks which typically require a skilled and experienced operator (hair stylist, hair dresser, etc.) who performs a haircut and/or hairstyling operation at a user. Generally, even if the user is satisfied with a particular haircut or hairstyle, the manual task needs to be performed repeatedly, for instance every four to eight weeks for relatively short haircuts. Further, even a well-experienced hairdresser or hairstylist cannot always exactly reproduce a certain haircut. The hairdresser may, on the one hand, imagine the to-be-applied haircut based on the current (grown) state of the hair. On the other hand, the hairdresser may recall and visualize the originally processed state of the previously performed haircut. Further, a user may choose and request a certain haircut by pointing at a visual representation of his/her own or other people wearing a model haircut.

Several attempts have been made to provide smart haircutting appliances which allow a user to cut his/her hair or the hair of another person in a machine supported and controlled fashion. To this end, a haircutting appliance may be provided which is arranged to adjust a present cutting length dependent on a certain position at the head of the to-be-treated person. In other words, the desired haircut is stored in a computing device which is arranged to operate the haircutting appliance accordingly, for instance by adjusting a movable spacing comb. This basically requires that the model of the haircut is already stored in the computing device. It has been proposed to record machine parameters of the haircutting appliance when the haircut is actually performed so that the haircutting procedure can be repeated at a later time.

In this context, WO 2013/163999 A1 discloses a programmable hair trimming system comprising a hair trimming device, said hair trimming system being arranged to detect, by means of an electromagnetic tracking system, the position of the hair trimming device in relation to the head of a person on whom a hair trimming is being performed; relate said position to previously generated hair length profile data regarding the desired hair trimming length at various positions; and automatically and dynamically adjust the hair trimming length of said hair trimming device according to its present position and the hair length profile data.

There is still a certain need for improvements in and alternative approaches to automated haircut/hairstyle processing. In particular, position detection and monitoring still faces major challenges. As the object of the hair processing procedure is typically a human head, it is required to detect the position of the hair processing appliance with reasonable accuracy and to match information describing the intended hair processing operation (e.g. a hair topology model/hair length profile) with the actual head/scalp shape.

Hence, there is still room for improvement in automated haircut recording appliances and methods.

SUMMARY OF THE INVENTION

It is an object of the present disclosure to provide a position monitoring arrangement for an automated hair processing system, an automated hair processing system and a corresponding method of operating an automated hair processing system which address at least some of the above-indicated issues.

Particularly, improvements in position monitoring are sought for. Preferably, embodiments in accordance with the present disclosure enable a robust and accurate position detection and tracking of a hair processing appliance with respect to the head/scalp of the treatment subject (whose hair is processed).

Further, it is desired to provide more robust and less error-prone position monitoring approaches which take into account a current state of involved position sensors. Preferably, adverse distortions and/or a mismatch between the actual head shape and orientation of the treatment subject and an applied data representation based on which the hair processing appliance is operated can be avoided or, at least, reduced to a great extent.

In a first aspect of the present disclosure, a position monitoring arrangement for an automated hair processing system is presented, the arrangement comprising:
  a plurality of position sensors arranged to be attached to a subject whose hair is to be processed,
  a transmitter that is operatively coupled with at least two position sensors of the plurality of position sensors, and
  a position controller that is arranged to detect a relative orientation between the at least two position sensors of the plurality of position sensors arranged to be attached to a subject whose hair is to be processed and that signals a misorientation state.

This aspect is based on the insight that monitoring the position sensors so as to detect and monitor respective relative movement therebetween may be used as a reliable measure for detecting displaced/rotated position sensors. As a result, the user may be prompted to attach/mount the position sensors in a steadier fashion. Further, the user may be prompted to recalibrate the position monitoring arrangement.

In case a relative orientation/position of a single sensor with respect to the user's head is changed, a recalibration is advisable so as to avoid that a misalignment/mismatch between the actual shape of the head of the user and the hair property model applied thereto occurs. In other words, assuming that a single position sensor which is attached to an ear of the user is rotated within the ear channel, also a respective rotation and/or distortion of the haircut/hairstyle model might occur as a result thereof. Hence, since any previously performed calibration would no longer be valid in this case, as a result, the hair processing appliance could not be operated properly as the assumed detected position does no longer correspond to the actual position with respect to the actual shape of the head.

In at least some exemplary embodiments, the position sensors are arranged as ear-mountable or ear-wearable sensors. Typically, the position sensors are at least partially inserted in the ear channel. Hence, quite likely, the position sensors may rotate in the ear channel or even slip off.

As it is not very likely that two or even more of the plurality of position sensors move/rotate/slip off at the same time, a relative movement/displacement between the sensors is highly indicative of a respective misorientation of at least one position sensor.

Generally, a central control unit may be provided which implements the position controller and also other controllers. Needless to say, in at least some embodiments, distributed controllers may be present.

When a respective misorientation state has been detected, several measures may be taken. For instance, it may be signaled to the user that a recalibration is necessary. Once the recalibration procedure is finished, the hair processing procedure may be resumed.

In accordance with an exemplary embodiment, the at least two position sensors are arranged to be attached to a head of the subject, wherein the position controller is arranged to detect at least one of an actual orientation and an actual position of a hair processing appliance with respect to the head.

The position of the hair processing appliance with respect to the head is, as a general measure in accordance with exemplary embodiments, detected in a mediate fashion via the position sensors. Hence, the position sensors may sense or detect the position of the hair processing appliance with respect to the sensors. As the general position and orientation of the position sensors with respect to the user's head is known, due to the calibration, the position of the appliance with respect to the head may be calculated.

In accordance with another exemplary embodiment, two position sensors are provided that are arranged as ear-mountable position sensors. In certain embodiments, exactly two sensors involving a right ear sensor and a left ear sensor are implemented.

It is beneficial to attach or mount the two position sensors to the user's ears. A main benefit is that the two sensors are therefore more or less aligned along a common axis that is defined by the two ears. Further, the ears (ear channels) of the user are generally not fully covered by hair but arranged in close proximity of the scalp. Hence, the user's ears may be regarded as a viable reference contour and reference position for position detection.

In accordance with another exemplary embodiment, the two sensors are arranged as earplug sensors or ear bud sensors, wherein the position controller is arranged to detect a relative rotation distortion, due to undesired sensor rotation in the ear.

In at least some embodiments, the two sensors further comprise ear bows which are arranged to be mounted between the auricle and the side of the head. However, depending on the overall movement of the user and particularly on head movements such as nodding, turning, etc., also ear-worn sensors that are considerably fixed to the ear may be displaced or rotated with respect to the head. As a result, position detection accuracy would be impaired.

Arranging the two sensors as ear-worn sensors has the advantage that the field of view of the user is not considerably obstructed. Further, it has been observed that other types of position sensors which may be attached to the face and/or further portions of the head that are different from the ears have been experienced as being unpleasant.

In accordance with another exemplary embodiment, the position controller is arranged to detect a set relative orientation between the at least two position sensors in a calibration mode and to detect a defined change in the relative orientation between the at least two position sensors in an operation mode.

In an initial state, when the two position sensors are attached to the ears, a calibration takes place. Hence, the orientation of the two position sensors with respect to one another and with respect to the user's scalp is detected and stored, at least for the planned hair processing procedure. The set orientation may be also referred to as calibrated orientation.

In accordance with another exemplary embodiment, the relative orientation change detected by the position controller is a rotation orientation change.

As indicated above, when ear-worn sensors are used, a rotation of one position sensor with respect to the ear and, consequently, with respect to the other position sensor may be detected. Hence, a relative rotation orientation change may occur which can be detected by the position controller with relatively little effort.

In accordance with another exemplary embodiment, the transmitter is a magnetic field transmitter that generates an alternating magnetic field, wherein the at least two position sensors are magnetic sensors.

As used herein, the magnetic sensors may be arranged to detect the presence and/or characteristics of a magnetic field. In further exemplary embodiments, the magnetic sensors may be arranged to bias a magnetic field. In further exemplary embodiments, the magnetic sensors may be arranged to generate the magnetic field. However, in certain exemplary embodiments, the transmitter is arranged to generate the magnetic field which can be sensed by the magnetic sensor.

More generally, as used herein, a position sensor may be any device that permits orientation and/or position measurement. A position sensor may be arranged as an absolute position sensor and/or a relative position sensor. A relative position sensor may be also referred to as displacement sensor. Several further types of position sensors may be envisaged, involving but not limited to: capacitive transducers, Eddy-current sensors, Ultrasonic sensors, Hall effect sensors, optical proximity sensors, potentiometers, etc.

Further, the position monitoring arrangement may implement or utilize an indoor positioning system which may be based on wireless technology, such as Wi-Fi. Further, indoor positioning systems may utilize at least one of the above-presented sensor techniques.

Referring again to the above-described embodiment involving magnetic sensors, several types of magnetic sensors are known. For instance, magnetic sensors may be based on the Hall effect. Further, magnetic sensors are known which utilize the anisotropic magnetoresistive effect. Further, magnetic sensors are known which implement a magnetically actuated Reed switch for detecting magnetic fields.

In accordance with another exemplary embodiment, at least one position sensor of the plurality of position sensors arranged to be attached to a subject whose hair is to be processed comprises a coil arrangement that senses an electromagnetic field created by the transmitter, wherein an orientation signal is transmitted from the at least one position sensor to the position controller.

In other words, the position sensors are arranged to sense, with their coil arrangement, the presence and further characteristics of an electromagnetic field. Therefore, the coil arrangement may be also referred to as antenna.

In accordance with another exemplary embodiment, the coil arrangement comprises a plurality of coils that are arranged at a different orientation with respect to one another. Hence, a multi-axis detection is enabled. A benefit is that position detection may be performed in a more accurate fashion.

For instance, a coil arrangement for the position sensor may involve three coils which are arranged in a fashion basically perpendicular with respect to one another. In other words, three main sensing axes that are perpendicular with respect to one another may be present. Hence, not only a distance but also an orientation change may be detected. A multi-coil arrangement is beneficial for the detection of relative movements between the position sensors.

In a further aspect of the present disclosure, an automated hair processing system, particularly a hair cutting system, is presented, the system comprising a portable hand-held hair processing appliance, a hair processing unit arranged at the appliance, and a position monitoring arrangement in accordance with at least one embodiment as discussed herein, wherein at least one feature of the hair processing appliance is controllable dependent on at least on of an actual orientation and an actual position of the hair processing appliance with respect to a head of the subject.

The processing unit may be particularly arranged as a cutting head, when the appliance is a haircutting appliance. Further, the at least one feature of the hair processing appliance may be a length setting feature. By way of example, an adjustable spacing comb of the hair processing appliance may be controlled dependent on the current position of the appliance with respect to the head of the user.

Further, in certain exemplary embodiments, the transmitter is attached to or arranged at the hair processing appliance. Therefore, the appliance as such may generate the magnetic field which is sensed by the position sensors. When one of the position sensors is displaced or rotated with respect to the other one, as a result, a detected sensing signal that describes the electromagnetic field will be changed accordingly.

In accordance with an exemplary embodiment of the hair processing system, the transmitter is arranged at the housing of the hair processing appliance, wherein the at least two position sensors form a position reference for magnetic position detection.

Hence, also the transmitter may involve a coil arrangement which may be used for the formation/generation of the emitted electromagnetic field. As the hair processing appliance as such is already provided with a battery, an accumulator and/or a mains connector, also power for the electromagnetic field is provided.

In accordance with another exemplary embodiment, the hair processing system further comprises a hair property controller that is arranged, on the basis of a hair property model, to control at least one feature of the hair processing system dependent on at least one of the actual orientation and the actual position of the hair processing appliance. The hair property model may include a representation/data set of hair length values (i.e. a comb length setting) dependent on a certain position at the user's or client's head.

In a further aspect of the present disclosure, a method of operating an automated hair processing system is presented, the method comprising the following steps:
attaching a plurality of position sensors to a subject whose hair is to be processed,
providing a transmitter that is operatively coupled with the at least two position sensors of the plurality of position sensors,
detecting a relative orientation between the at least two position sensors attached to the subject, and
signaling a misorientation state when a misorientation between the at least two position sensors is detected.

A misorientation state may involve that a certain level or degree of relative movement between two of the at least two position sensors is detected. To this end, a threshold or range for allowed relative movements may be defined.

As already indicated above, the hair property controller may form a part of or may be implemented by a central control unit that may also, at least in some embodiments, implement the position controller.

The hair property model may involve a hair property map which involves a (personalized) representation of the head or scalp topology of the subject of interest, or a (non-personalized) standard head or scalp topology model. Further, position values of the head/scalp topology may be assigned to hair property values, particularly to hair length values. As a result, a representation of the plan haircut or hairstyle may be provided.

In a calibration stage, the hair property model, particularly the underlying head/scalp topology model, is matched to the actual head/scalp shape of the to-be-treated client.

The hair property controller may be implemented in the hair processing appliance. However, in alternative embodiments, the hair property controller and also the position controller may be implemented in a separate computing device. The computing device may be for instance arranged as a mobile computer, a mobile phone, a Tablet computer, etc.

However, also sophisticated hair processing appliances may be envisaged which provide sufficient computing capacity. Hence, in at least some embodiments, the controls including the hair property controller and the position controller may be implemented in the hair processing appliance.

In accordance with an exemplary embodiment, the method further comprises:
performing an initial calibration, thereby defining a set relative orientation between the at least two position sensors,
monitoring the relative orientation between the at least two position sensors,
performing a hair processing operation involving detecting an orientation and position of a hair processing appliance with respect to a head of the subject, wherein the at least two position sensors form a position and orientation reference, and when a defined change in the relative orientation between the at least two position sensors is detected, stopping an operation of the hair processing appliance.

Hence, when there is a certain risk that the applied hair topology model no longer matches the actual head shape, further processing dependent on a potentially distorted match is prevented.

In a further aspect of the present disclosure, a computer program is presented, the program comprising program code means for causing a computing device to carry out the steps of the methods as discussed herein, when said computer program is carried out on a computing device.

The program code can be encoded in one or more non-transitory, tangible media for execution by a computing machine, such as a computer. In some exemplary embodiments, the program code may be downloaded over a network to a persistent memory unit or storage from another device or data processing system through computer readable signal media for use within the system. For instance, program code stored in a computer readable memory unit or storage medium in a server data processing system may be downloaded over a network from the server to the system. The data processing device providing program code may be a server computer, a client computer, or some other device capable of storing and transmitting program code.

As used herein, the term "computer" may stand for a large variety of processing devices. In other words, also mobile devices having a considerable computing capacity can be referred to as computing devices, even though they provide less processing power resources than standard "computers". Needless to say, such a "computer" can be part of a personal care device and/or system. Furthermore, the term "computer" may also refer to a distributed computing device which may involve or make use of computing capacity provided in a cloud environment. The term "computer" or "computing" may also relate to medical technology devices, health tech devices, personal care devices, fitness equipment devices, and monitoring devices in general, that are capable of processing data. Any automated information processing device or system capable of processing respective data may be referred to as computing device.

Preferred embodiments of the disclosure are defined in the dependent claims. It shall be understood that the claimed method, system and computer program can have similar and/or identical preferred embodiments as the claimed arrangement and as defined in the dependent claims, and vice versa.

BRIEF DESCRIPTION OF THE DRAWINGS

These and other aspects of the disclosure will be apparent from and elucidated with reference to the embodiments described hereinafter. In the following drawings

DETAILED DESCRIPTION OF THE EMBODIMENTS

Figure 1:
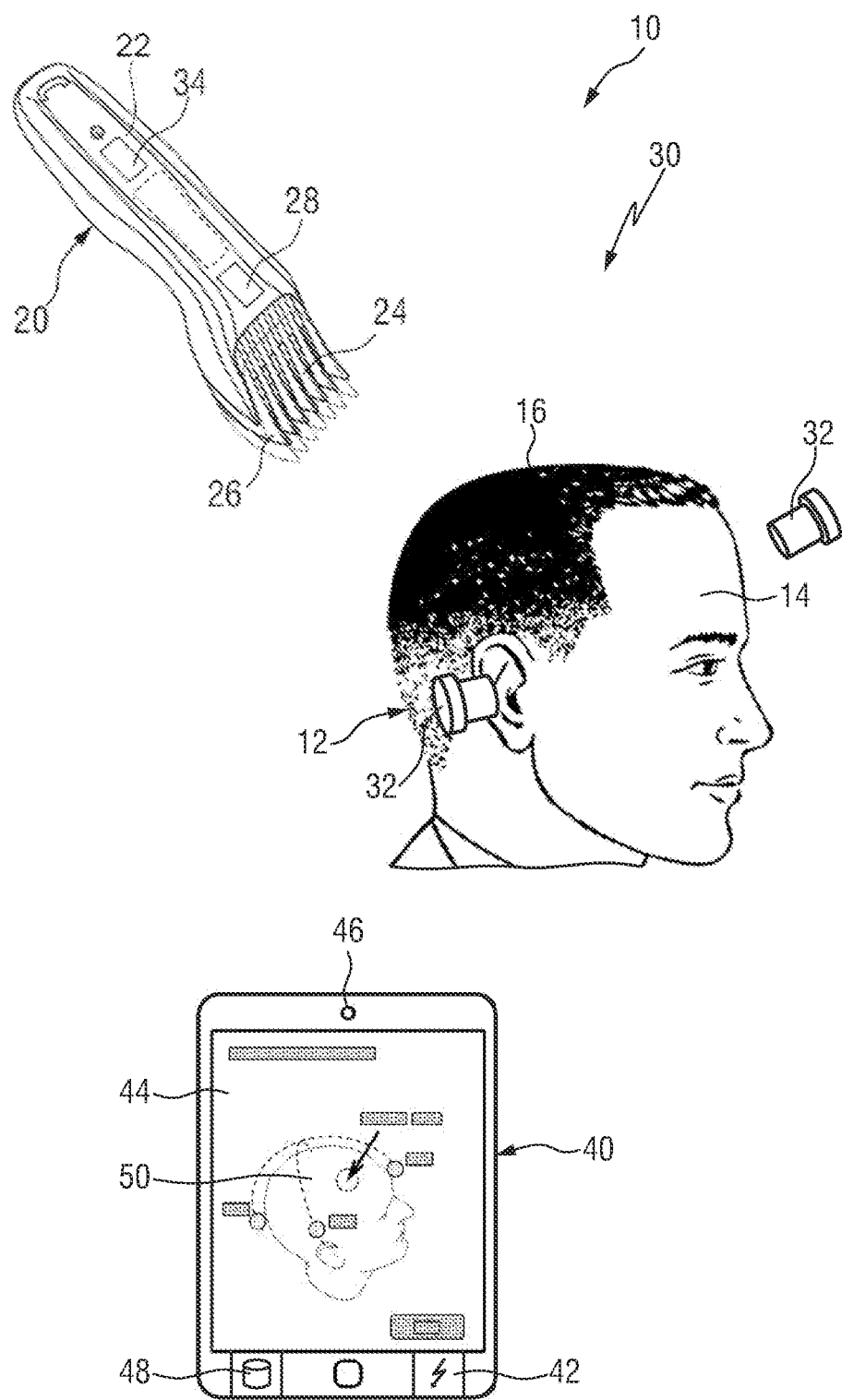
FIG. 1 shows a simplified general layout of an exemplary embodiment of an automated hair processing system.

FIG. 1 shows a simplified schematic illustration of an automated hair processing system 10 which may be also referred to as automated hairstyle processing system. The system 10 may be also referred to as automated haircut processing system. In general, as already indicated further above, the present disclosure generally relates to grooming, processing and/or styling human hair and animal hair which may involve head hair and body hair.

The system 10 is arranged to perform a haircut or hairstyle operation at a client or subject 12 in a computer-aided automatic and/or semi-automatic fashion. A field of application for the system 10 may be a hair processing operation applied to the user itself. Hence, in the following the subject 12 will be referred to as user, even though a third person may operate the appliance. Needless to say, also another person may operate the system 10.

In FIG. 1, a haired portion 16 at a head or scalp portion 14 of the user 12 is illustrated. Generally, the system 10 is arranged as a "smart" haircutting or hairstyling system.

The system 10 comprises a haircutting appliance 20 which may be also referred to as automated haircutting appliance. The appliance 20 is arranged as a hand-held or hand-guided appliance. Generally, the appliance 20 may be similar to a standard non-automated haircutting appliance but may be augmented and supplemented by additional processing and control features. Generally, the device 20, particularly a housing 22 thereof, may be grasped by a user and operated so as to cut hair. This may involve moving the device 20 through the haired portion 16 at the head portion 14 of the user 12 and cutting hairs to a desired length. The device 20 may be held and operated by the subject 12 itself (whose haircut is to be processed). In the alternative, the device 20 may be operated by another individual.

The device 20 comprises a processing unit 24 which is attached to the housing 22. The processing unit may involve, for instance, a blade set. Further, a comb 26 may be coupled with the processing unit 24. In at least some embodiments, the comb 26 is arranged as an adjustable spacing comb. Further, an adjustment unit 28 for the comb 26 is provided. Generally, the comb 26 defines an offset between a skin or scalp level at the subject 12 and the processing unit 24. Consequently, the hair length may be controlled.

In automated hair processing systems 10, the operation of the appliance 20 may be controlled dependent on an actual position of the appliance 20 with respect to the user 12. To this end, a position monitoring arrangement 30 is provided. The position monitoring arrangement 30 comprises a plurality of position sensors 32. For instance, as shown in FIG. 1, two position sensors 32 may be provided. Each of the position sensors 32 shown in the exemplary embodiment illustrated in FIG. 1 is arranged as an ear-wearable or ear-mountable sensor 32. More particularly, at least in some embodiments, the position sensors 32 may be referred to as ear plug sensors or ear bud sensors.

Further, a transmitter 34 may form part of the position monitoring arrangement. In the arrangement as shown in FIG. 1, the transmitter 34 is implemented in the appliance 20. The transmitter 34 cooperates with the position sensors 32. As a result, a position and orientation of the appliance 20 with respect to the head 14 of the user 12 may be detected and tracked. In regard of a general layout of a position detection system for an automated hair processing system, reference is made again to WO 2013/163999 A1.

In general, the main purpose of the position monitoring arrangement 30 is to detect a current position of the appliance 20, particularly of the processing unit 24 thereof, with respect to the haired portion 16 of the head portion (scalp) 14 of the subject 12. Consequently, the actual position of the appliance 20 may be assigned to a respective hair property value, particularly to a hair length value. As a result, automated hair processing is enabled as the adjustment unit 28 may be automatically operated so as to adjust the comb 26 accordingly.

As further shown in FIG. 1, also a computing device 40 may form part of the system 10. This may be for instance the case when the appliance 20 as such does not provide sufficient data processing and computing capacity. By way of example, the computing device 40 may be arranged as a mobile device such as a tablet computer, a mobile phone, etc. The computing device 40 comprises a processing unit which implements at least one controller 42. The controller 42 may be also referred to as position controller.

Further, user feedback units 44, 46 may be provided as to establish an interaction between the user and the appliance 20 via the computing device 40. For instance, user feedback may be provided via a display 44 and via speakers 46. Further, a memory unit 48 may be arranged at the computing device 40. The memory unit 48 may be used to store hairstyle and/or haircut models. More generally, operational data may be stored in the memory unit 48. In FIG. 1, visual information 50 is displayed on the screen 44. Hence, visual operator guidance may be provided which further facilitates the hair processing operation.

A head topology model and a hairstyle model may be stored in the memory unit 48. Hence, a respective hair length value may be assigned to a specific scalp portion.

Figure 2:
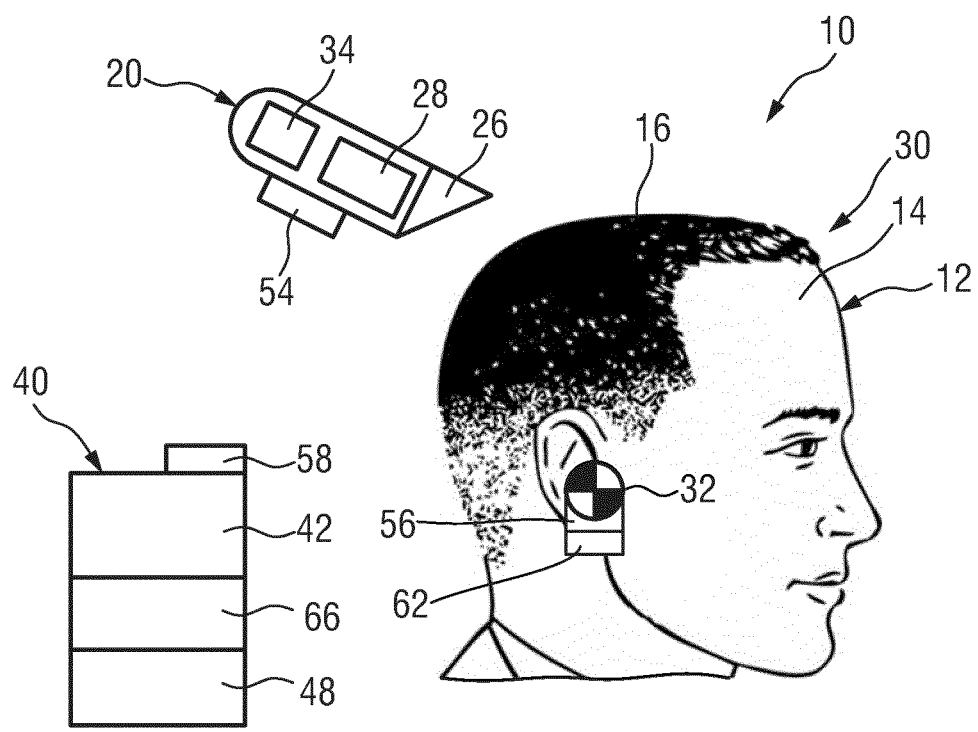
FIG. 2 shows another alternative layout of an embodiment of an automated hair processing system.

Further reference is made to FIG. 2 illustrating an alternative embodiment of a hair processing system 10. As with the embodiment of FIG. 1, a hair processing appliance 20 is provided. Further, a position monitoring arrangement 30 implementing two ear-wearable sensors 32 is provided. As indicated by a simplified block representation, also a computing device 40 may be provided. It is to be noted that the computing device 40 as such may be also integrated in the appliance 20. Hence, the appliance 20 as such may comprise sufficient computing capacity.

In FIG. 2, the appliance 20, the computing device 40 and the sensors 32 are illustrated in a more simplified schematic representation.

So as to monitor the position of the appliance 20 with respect to the user 12 and to operate the comb 26 accordingly, data links may be established between the appliance 20, the computing device 40 and the position monitoring arrangement 30, particularly the sensors 32 thereof. At the appliance 20, a control interface 54 is provided. At the sensors 32, a control interface 56 is provided. At the computing device 40, a control interface 56 is provided. In FIG. 2, a wireless data exchange between the control interfaces 54, 56, 58 is established.

Further, the sensors 32 may be provided with a battery 62 or, more generally, with a power supply. Hence, at least in some exemplary embodiments, the sensors 32 are arranged as active sensors that are capable of transferring data. By way of example, the transmitter 34 of the appliance 20 may be arranged as an electromagnetic transmitter that generates an electromagnetic field. The sensors 32 may be arranged to sense the electromagnetic field generated by the transmitter 34. Hence, the position of the appliance 20 with respect to the sensors 32 may be detected and thus the position of the appliance 20 with respect to the user's scalp 14.

A respective signal that is indicative of the current position and/or orientation of the appliance 20 may be transferred via the control interfaces 56, 58 to the computing device 40. Hence, the position controller 42 may calculate a current position of the appliance 20. Further, the computing device 40 may implement a hair property controller 66 that controls a setting of the appliance 20 dependent on the current position. By way of example, the hair property controller 66 may assign a defined comb length value to the detected position of the appliance 20. A corresponding control signal may be transferred via the control interfaces 54, 56 to the appliance 20, particularly to the adjustment unit 28 thereof. Hence, a feature of the appliance 20 may be controlled dependent on the current position of the appliance 20 in a continuous or quasi-continuous fashion.

Figure 3:
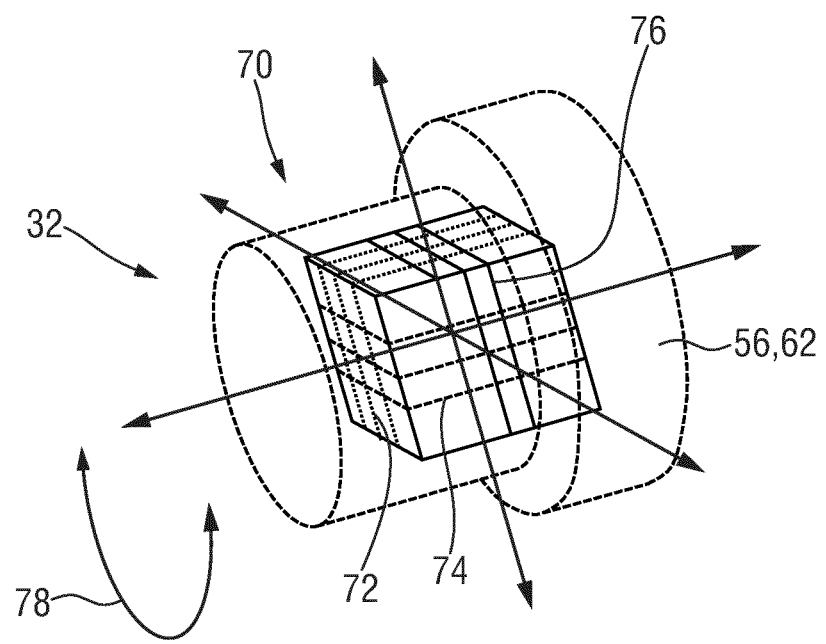
FIG. 3 shows a simplified perspective view of an ear-wearable position sensor that is arranged to be used in a position monitoring arrangement for an automated hair processing system.

FIG. 3 illustrates an exemplary embodiment of an ear-wearable position sensor 32. As indicated above, the position sensor 32 may be provided with a control interface 56 for communication. Further, a battery and/or power supply 62 may be provided, refer also to FIG. 2. A sensing section of the sensor 32 may involve a coil arrangement 70. Hence, the position sensor 32 may be arranged to sense an electromagnetic field. The appliance 20 may be provided with a respective transmitter 34, refer also to FIG. 2. As a consequence, depending on the characteristics of the sensed electromagnetic field, the position sensor 32, particularly a plurality of respective sensors 32, may detect the position of the appliance 20.

So as to increase a position detection accuracy, a multi-axis coil arrangement 70 may be provided. In FIG. 3, a first coil 72, a second coil 74 and a third coil 76 are illustrated. The coils 72, 74, 76 are arranged at an orientation offset with respect to one another. For instance, the coils 72, 74, 76 may be respectively perpendicular to one another. As a consequence, not only a distance detection but also a spatial position detection may be enabled. Further, since typically a plurality of sensors 32, particularly a pair of opposite ear-mounted sensors 32, is used, a high precision position monitoring is enabled which results in an improved accurate hair processing operation.

It has been observed that a position monitoring arrangement 30 that implements ear-wearable sensors 32 as shown in FIG. 1 and FIG. 2 is a practicable and viable approach to position monitoring for automated hair processing systems 10.

However, it has been observed as well that particularly ear-wearable or ear-mountable sensors 32 are prone to undesired sensor movements, particularly to undesired sensor rotation about a main axis thereof, refer also to the curved double-arrow designated by reference numeral 78 in FIG. 3 that indicates undesired sensor rotation.

Figure 4:
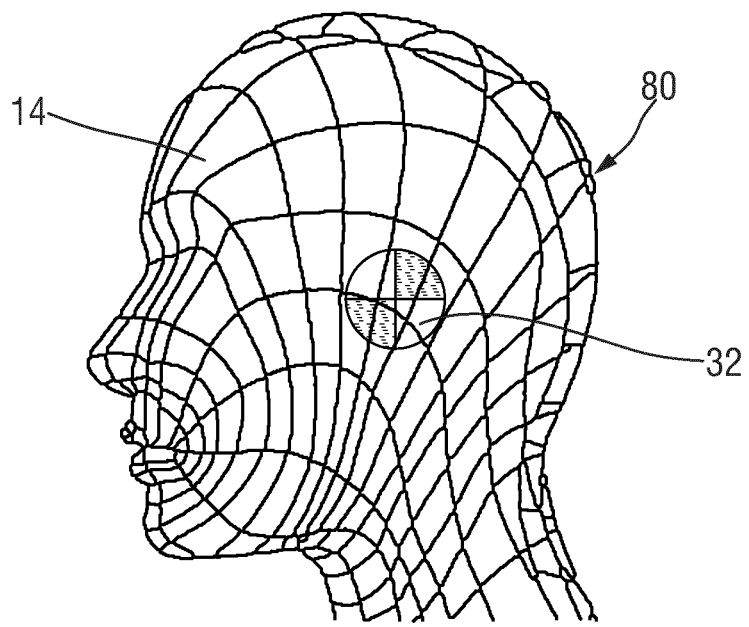
FIG. 4 is a schematic simplified side view of a model representation of a user's head in which a position reference is provided.
Figure 5:
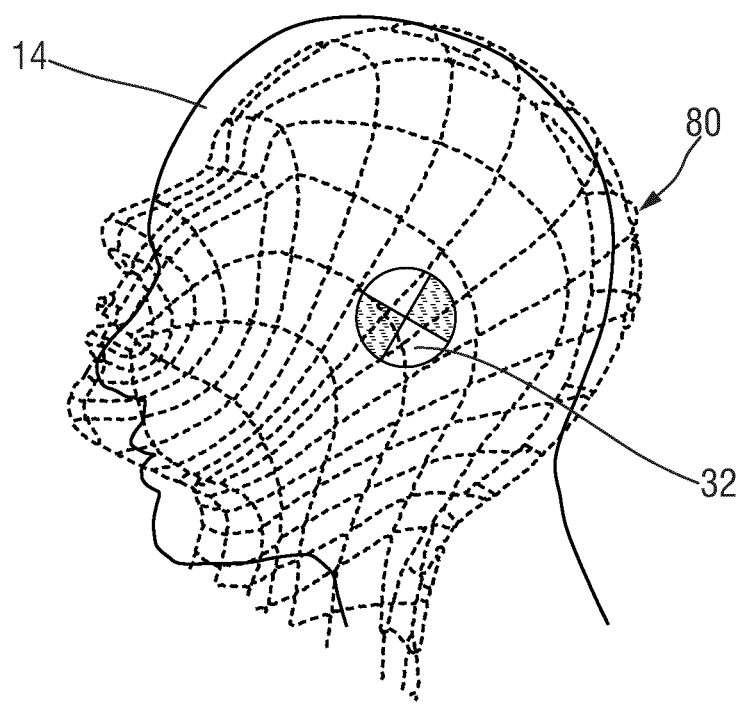
FIG. 5 is a further simplified schematic side view of a model of a user's head wherein, due to undesired sensor movements, a misalignment is present.

Further reference is made to FIG. 4 and FIG. 5, illustrating a simplified side view of a model scalp 14. A topology of the scalp 14 is indicated by a grid which is mapped to the head. Hence, a model 80 can be provided which includes a representation of the topology of the scalp 14 and corresponding hair property values, for instance hair length values. As indicated by reference numeral 32, a position sensor is attached to the head. At the beginning of a hair processing procedure, position detection may be initiated by applying the sensor 32 and by calibrating the position monitoring arrangement 30 that utilizes the sensor 32.

As shown in FIG. 3, the sensor 32 may be arranged as a position sensor that is capable of detecting spatial positions. For instance, the coil arrangement 70 involving three coils 72, 74, 76 as shown in FIG. 3 enables three-dimensional position detection. In other words, the coil arrangement 70 may determine an inherent coordinate reference of the sensor 32. By way of example, the sensor 32 may be capable of detecting a distance between the transmitter 34 of the appliance 20 and the sensor 32 in a longitudinal direction, a lateral direction and a height direction.

Further reference is made to FIG. 5. In FIG. 5, the position sensor 32 is still applied to the scalp 14 but is somewhat displaced or rotated. Hence, assuming that a calibration took place in a state as shown in FIG. 4, also the model 80 would be distorted when the sensor 32 is moved. In the state as shown in FIG. 5, the position of the appliance 20 (refer to FIG. 1 and FIG. 2) with respect to the distorted model 80 would be detected which does not correspond to the position with respect to the real scalp 14 of the to-be-processed subject.

Sensor rotation is a particular issue as a preferred mounting position for the position sensor 32 is the ear portion of the user. Therefore, the sensors 32 are typically arranged as ear bud sensors or ear plug sensors. For instance, the position sensors 32 may be at least partially inserted in the ear canal. Hence, quite likely a rotation of the position sensor 32 about a central axis of the ear canal may occur when the position sensor 32 is not mounted in a sufficiently fixed fashion.

The same may apply in case the position sensor 32 is provided with an ear hook that is arranged to be placed behind the auricle. Hence, a positioning aid is provided. However, as a really fixed attachment of such an ear bow to the auricle would be experienced as being unpleasant, typically only a relatively soft mounting of the position sensor is applied. Hence, this may still give rise to undesired sensor movements with respect to the scalp 14 of the user, resulting in a distorted hair property model 80.

Figure 6:
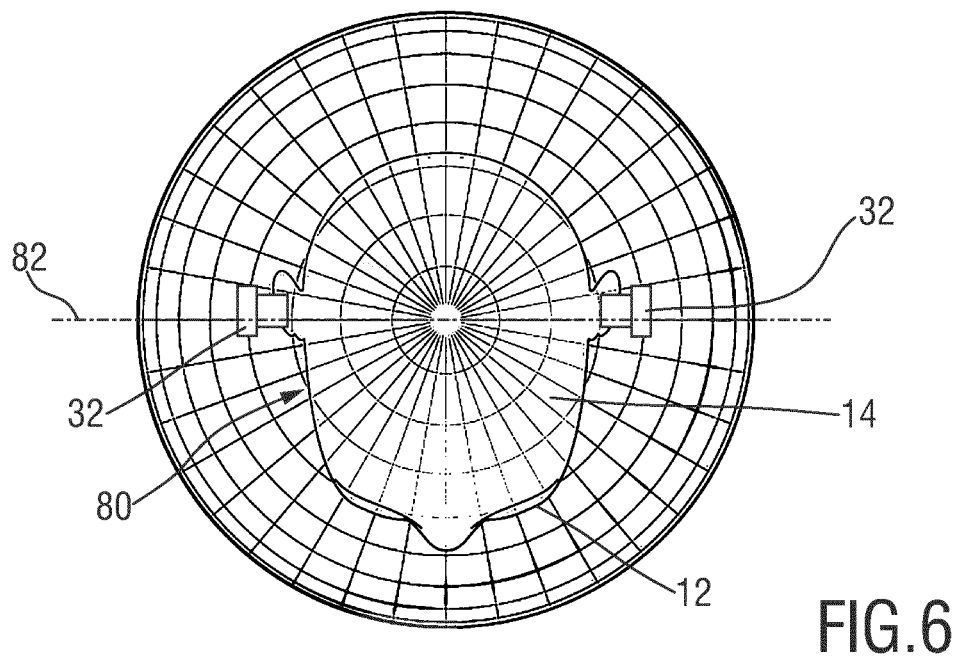
FIG. 6 is a simplified schematic top view of a model of a user's head in a polar coordinate system, wherein two ear-wearable position sensors are indicated.
Figure 7:
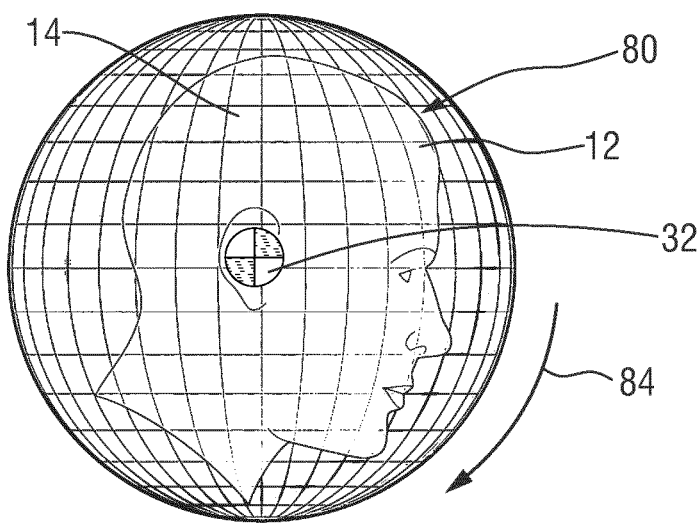
FIG. 7 is a right side view of the arrangement of FIG. 6.
Figure 8:
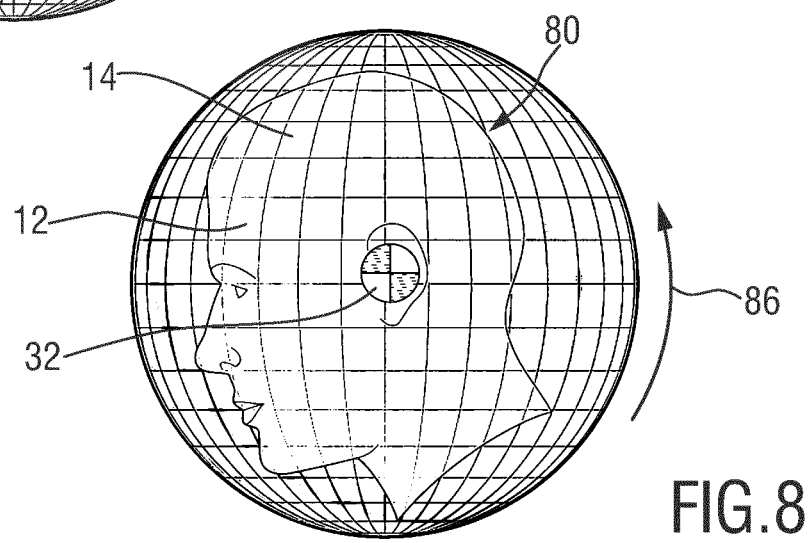
FIG. 8 is a left side view of the arrangement of FIG. 6.

Further reference is made to FIG. 6, FIG. 7 and FIG. 8. FIG. 6 is a simplified schematic top view of a user's scalp 14, whereas FIG. 7 and FIG. 8 respectively illustrate a corresponding right side view (FIG. 7) and left side view (FIG. 8). As shown, two position sensors 32 may be applied. Each of the position sensors 32 may be attached to an ear of the user 12. In FIG. 6, FIG. 7 and FIG. 8, a coordinate reference is indicated by a globe that represents, for instance, a polar coordinate system implementing a longitude and latitude grid scheme.

During an initial calibration of the position sensors 32, the position sensors' 32 inherent position references may be correlated with the global model 80. Applying two or even more position sensors 32 further increases the position detection accuracy. Hence, the position of the appliance 20 with respect to the scalp 14 of the user 12 may be detected in a precise fashion.

A further benefit of the provision of two or more position sensors 32 is that also relative movements between the position sensors 32 may be detected. By way of example, a rotation of the right side position sensor 32 as shown in FIG. 7, refer to the arrow 84 with respect to the left side position sensor 32 as shown in FIG. 8 may be detected. By contrast, a rotation of the left side position sensor 32 (refer to the arrow 86 in FIG. 8) with respect to the right side position sensor 32 may be detected. A rotation axis in indicated in FIG. 6 by reference numeral 82.

In a normal state of operation, no relative movement between the sensors 32 should be present. Therefore, whenever a considerable movement between the position sensors 32 is detected which may involve applying a respective relative movement threshold, it may be concluded that the initial calibration of the position sensors 32 is no longer valid.

As a result, it may be further concluded that the position detection does no longer fulfill the required accuracy level. In other words, a model head topology which forms part of the hair property model 80 does no longer match the actual contour of the scalp 14 of the user 12.

A remedy for this undesired misorientation state may be to prompt the user of the appliance to recalibrate the position monitoring arrangement 30, refer to FIG. 1. Hence, the position sensors 32, in their actual mounting position and orientation, may be correlated with the actual scalp contour of the subject 12 which involves a matching of the hair property model 80 with the present contour of the scalp 14. Further, the user may be prompted to reattach the displaced/rotated position sensor 32 in a firm fashion.

As a result, a detection of the position of the appliance 20 with respect to the position sensors 32 enables a mediate but rather high-precision detection of the position of the appliance 20 with respect to the scalp 14. Hence, in accordance with the hair property model 80 that is used for the present hair processing procedure, the appliance 20 may be operated so as to perform the desired hair processing operation.

Applying two or more position sensors 32 has the further advantage that a movement of the head of the subject 12, for instance nodding, turning, etc. may be discriminated from a relative movement between the two or more position sensors 32. Hence, in each case, respective appropriate countermeasures may be taken.

Whenever a certain relative movement between the position sensors 32 is detected, particularly a relative rotation about an axis 82 (FIG. 6) that extends between the ears of the subject 12, it may be assumed that this relative movement is attributable to at least one of the sensors 32 getting or slipping out of position.

Figure 9:
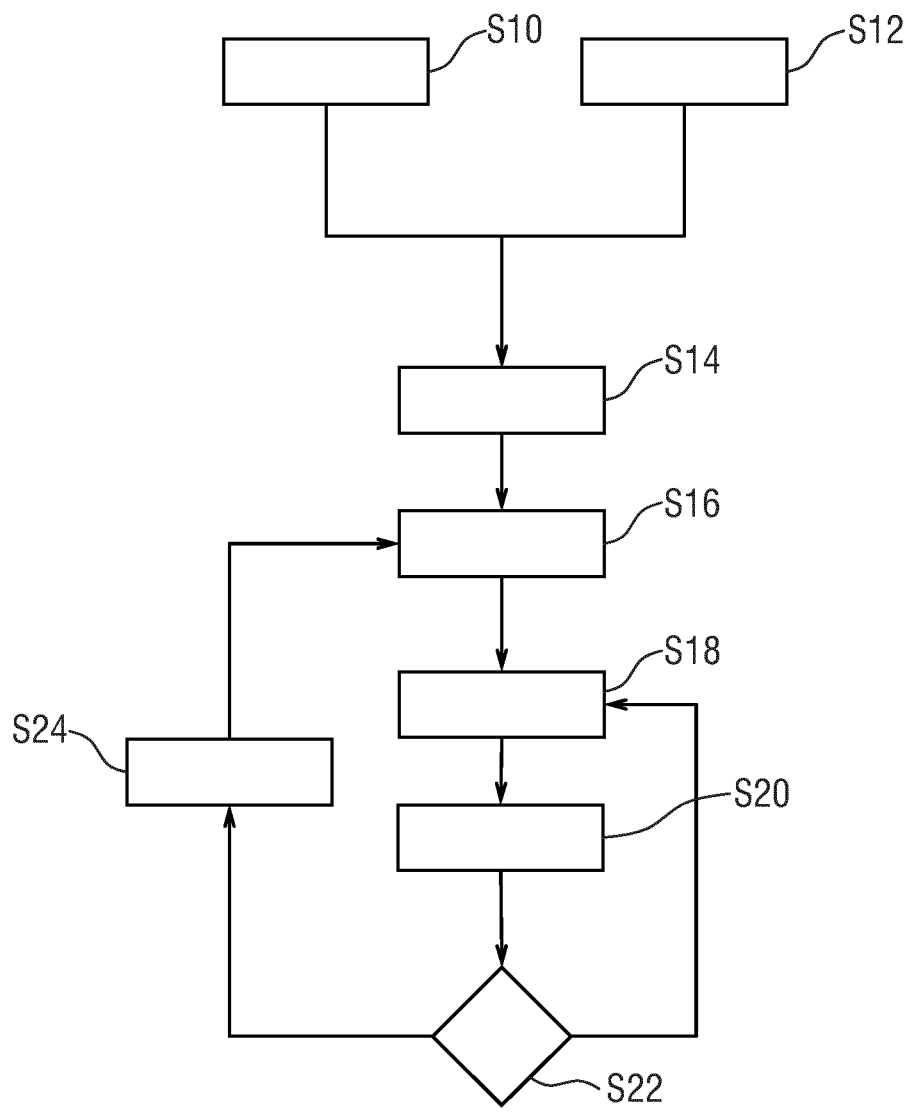
FIG. 9 is a simplified block diagram of an embodiment of a method of operating an automated hair processing system.

Reference is made to FIG. 9, showing a simplified block diagram illustrating an embodiment of a method of automated hair processing.

The method involves a step S10 including a provision of a hair processing appliance, particularly a haircutting or hairstyling appliance. Further, the method involves a step S12 including a provision of a position monitoring system involving at least two position sensors which may be arranged to be attached to a user's head. Preferably, the position sensors are arranged as ear-wearable or ear-mountable sensors.

In a further step S14, the position sensors are attached and put in place. Hence, for instance, a first position sensor may be attached to the left ear and a second position sensor may be attached to the right ear of the user.

In a subsequent step S18, a calibration takes place. The calibration step S18 correlates an inherent position/orientation reference of the position sensors with a global position reference, i.e. the head/scalp topology of the user. Hence, a hair property model including a head/scalp topology and corresponding hair property values, particularly hair length values, may be matched with the actual user's head.

Further, a hair processing step S18 may be initiated. The hair processing step S18 may include a haircutting or, more generally, hairstyling operation.

Typically, the hair processing procedure involves a position monitoring step S20. The position monitoring involves a detection of a position of the hair processing appliance with respect to the user's head. Hence, based on the hair property model, respective features of the hair processing appliance may be controlled accordingly in a position-dependent fashion. This results in an automated or computer-aided hair processing procedure.

Further, a position control step S22 is provided which is, in the exemplary embodiment illustrated in FIG. 9, arranged as a decision step. In the step S22, a relative position/orientation between the two sensors is monitored. In case it is detected that a level of relative motion/relative rotation between the position sensors exceeds a defined threshold, it may be concluded that one of the sensors turned or slipped out of place. In other words, in the step S22, an actual value/setpoint comparison may take place.

In case it is detected in the step S22 that an undesired level of sensor movement is reached, it may be indicated, in a step S24, that another calibration (step S16) is necessary (recalibration). Hence, the step S24 may be also referred to as signaling step. In the step S24, the user may be prompt to rearrange and put the sensors back into position.

When it is concluded in the step S22 that no adverse sensor movement takes place, the hair processing operation, step S18, may be continued or resumed which again involves the supplemental position monitoring step S20.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. A computing device may be a mobile or hand-held device, such as a mobile phone, a mobile computer, a table computer, etc.

Any reference signs in the claims should not be construed as limiting the scope.

The invention claimed is:

1. A hair cutting system, comprising a portable hand-held hair processing appliance, a hair processing unit arranged at the appliance, and a position monitoring arrangement, the arrangement comprising:
   a plurality of position sensors arranged to be attached to a subject whose hair is to be processed,
   a transmitter that is operatively coupled with at least two position sensors of the plurality of position sensors, and
   a position controller that is arranged to detect a relative orientation between the at least two position sensors arranged to be attached to the subject whose hair is to be processed in a calibration mode and to detect a defined change in the relative orientation between the at least two position sensors attached to the subject whose hair is to be processed in an operation mode,
   wherein the position controller is further arranged to signal a misorientation state between the at least two position sensors, and
   wherein at least one feature of the hair processing appliance is controllable dependent on at least on of an actual orientation and an actual position of the hair processing appliance with respect to a head of the subject.

2. The hair cutting system as claimed in claim 1, wherein the at least two position sensors are arranged to be attached to the head of the subject, and wherein the position controller is arranged to detect at least one of an actual orientation and an actual position of the hair processing appliance with respect to the head.

3. The hair cutting system as claimed in claim 1, wherein the at least two position sensors are provided that are arranged as ear-mountable position sensors.

4. The hair cutting system as claimed in claim 3, wherein the at least two position sensors are arranged as earplug sensors or ear bud sensors, and wherein the position controller is arranged to detect a relative rotation distortion, due to undesired sensor rotation in the ear.

5. The hair cutting system as claimed in 1, wherein the relative orientation change detected by the position controller is a rotation orientation change.

6. The hair cutting system as claimed in claim 1, wherein the transmitter is a magnetic field transmitter that generates an alternating magnetic field, and wherein the at least two position sensors are magnetic sensors.

7. The hair cutting system as claimed in claim 1, wherein at least one position sensor of the at least two position sensors of the plurality of position sensors arranged to be attached to the subject whose hair is to be processed comprises a coil arrangement that senses an electromagnetic field created by the transmitter, and wherein an orientation signal is transmitted from the at least one position sensor to the position controller.

8. The hair cutting system as claimed in claim 7, wherein the coil arrangement comprises a plurality of coils that are arranged at a different orientation with respect to one another.

9. The hair cutting system as claimed in claim 1, wherein the transmitter is arranged at the housing of the hair processing appliance, and wherein the at least two position sensors form a position reference for magnetic position detection.

10. The hair cutting system as claimed in claim 1, further comprising a hair property controller that is arranged, on the basis of a hair property model, to control at least one feature of the hair cutting system dependent on at least one of the actual orientation and the actual position of the hair processing appliance.

* * * * *